US008594428B2

(12) United States Patent
Aharoni et al.

(10) Patent No.: US 8,594,428 B2
(45) Date of Patent: Nov. 26, 2013

(54) INTERACTIVE SEGMENTATION OF IMAGES WITH SINGLE SCRIBBLES

(75) Inventors: Nadav Aharoni, Jerusalem (IL); Assaf Zomet, Jerusalem (IL); Yoav Gonen, Mevasseret Zion (IL)

(73) Assignee: HumanEyes Technologies Ltd., Jerusalem (IL)

( * ) Notice: Subject to any disclaimer, the term of this patent is extended or adjusted under 35 U.S.C. 154(b) by 1057 days.

(21) Appl. No.: 12/309,532

(22) PCT Filed: Jul. 25, 2007

(86) PCT No.: PCT/IL2007/000922
§ 371 (c)(1),
(2), (4) Date: Jan. 22, 2009

(87) PCT Pub. No.: WO2008/012808
PCT Pub. Date: Jan. 31, 2008

(65) Prior Publication Data
US 2009/0304280 A1 Dec. 10, 2009

Related U.S. Application Data

(60) Provisional application No. 60/820,232, filed on Jul. 25, 2006.

(51) Int. Cl.
*G06K 9/46* (2006.01)
*G06K 9/34* (2006.01)
*G06K 9/00* (2006.01)
(52) U.S. Cl.
USPC .......................................... 382/180; 382/190
(58) Field of Classification Search
USPC .......... 382/173, 190, 284; 345/179, 326, 348, 345/589, 592, 629; 715/236, 863
See application file for complete search history.

(56) References Cited

U.S. PATENT DOCUMENTS

| 5,202,828 | A  | * | 4/1993  | Vertelney et al. | 715/236 |
| 5,898,434 | A  | * | 4/1999  | Small et al.     | 715/810 |
| 2007/0165966 | A1 | * | 7/2007  | Weiss et al.     | 382/284 |
| 2009/0278859 | A1 | * | 11/2009 | Weiss et al.     | 345/629 |
| 2009/0304280 | A1 | * | 12/2009 | Aharoni et al.   | 382/180 |
| 2011/0175855 | A1 | * | 7/2011  | Youn et al.      | 345/179 |

FOREIGN PATENT DOCUMENTS

| JP | 2005-078158 | 3/2005 |
| WO | WO 2008/012808 | 1/2008 |

OTHER PUBLICATIONS

International Preliminary Report on Patentability Dated Feb. 5, 2009 From the International Bureau of WIPO Re.: Application No. PCT/IL2007/000922.
International Preliminary Report on Patentability Dated Feb. 2, 2009 From the International Bureau of WIPO Re.: Application No. PCT/IL2007/000922.

(Continued)

*Primary Examiner* — Amir Alavi

(57) ABSTRACT

A computer-implemented method for assigning attributes to an image. The method comprises allowing a user to mark a plurality of pixels of an image as a single marked area by a single scribble, the single marked area defines, for a current iteration, a target attribute, determining according to the target attribute an optimal function that defines at least one respective attribute of pixels in the image, assigning the at least one respective attribute to pixels in the image according to the optimal function, and displaying the at least one attribute of the pixels.

20 Claims, 10 Drawing Sheets
(8 of 10 Drawing Sheet(s) Filed in Color)

(56) References Cited

OTHER PUBLICATIONS

International Search Report Dated Jul. 7, 2008 From the International Searching Authority Re.: Application No. PCT/IL2007/000922.
Written Opinion Dated Jul. 7, 2008 From the International Searching Authority Re.: Application No. PCT/IL2007/000922.
Rother et al. "GrabCut—Interactive Foreground Extraction Using Iterated Graph Cuts", ACM Transactions on Graphics, XP002340109, 23(3): 309-314, Aug. 1, 2004. Fig.5.

Office Action Dated Jun. 7, 2012 From the Israel Patent Office Re. Application No. 196699 and Its Translation Into English.
Translation of Reason for Rejection Dated Jan. 6, 2012 From the Japanese Patent Office Re. Application No. 2009-521413.
Wang et al. "Interactive Video Cutout", ACM Transactions on Graphics (TOG), Proceedings of the ACM SIGGRAPH 2005, Jul. 2005, 24(3): 585-594.
Translation of Official Decision of Rejection Dated May 8, 2012 From the Japanese Patent Office Re. Application No. 2009-521413.

* cited by examiner

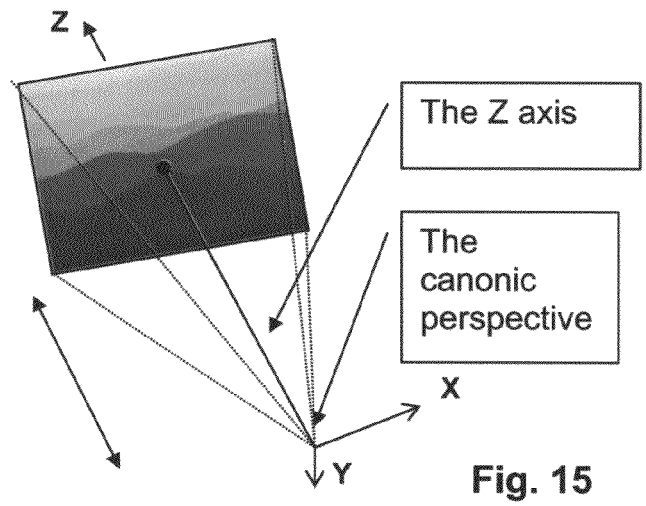
Fig. 15
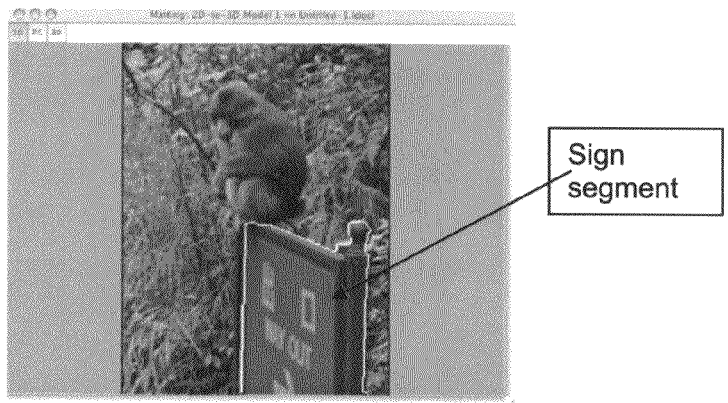
Fig. 16a
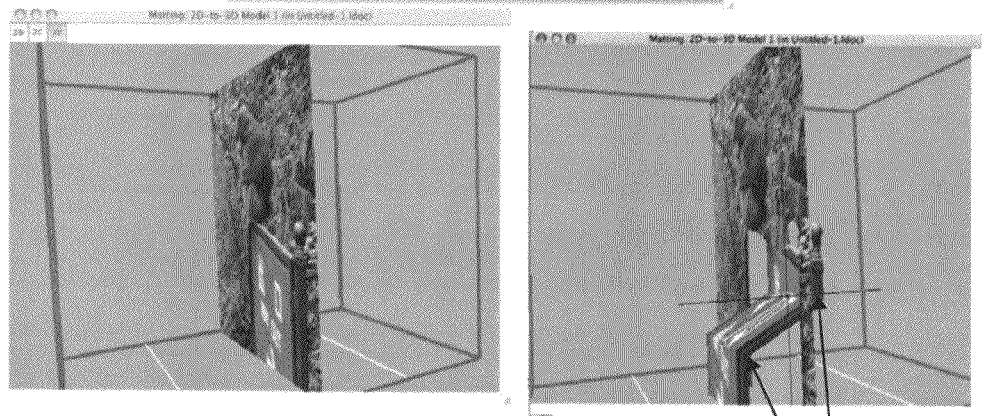
Fig. 16b    Fig. 16c

INTERACTIVE SEGMENTATION OF IMAGES WITH SINGLE SCRIBBLES

RELATED APPLICATIONS

This application is a National Phase Application of PCT Application No. PCT/IL2007/000922 having International Filing Date of Jul. 25, 2007, which claims benefit of U.S. Provisional Patent Application No. 60/820,232, filed on Jul. 25, 2006. The contents of the above Applications are all incorporated herein by reference.

FIELD OF THE INVENTION

This invention relates to graphic editing.

PRIOR ART

Prior art references considered to be relevant as a background to the invention are listed below and their contents are incorporated herein by reference. Additional references are mentioned in the above-mentioned U.S. provisional application Nos. 60/820,232 and their contents are incorporated herein by reference. Acknowledgement of the references herein is not to be inferred as meaning that these are in any way relevant to the patentability of the invention disclosed herein. Each reference is identified by a number enclosed in square brackets and accordingly the prior art will be referred to throughout the specification by numbers enclosed in square brackets.

[1] Rother, C. and Kolmogorov, V. and Blake, A. *GrabCut—Interactive Foreground Extraction using Iterated Graph Cuts*, SIGGRAPH, ACM Transactions on Graphics, August 2004.
[2] Leo Grady and Gareth Funka-Lea *Multi-Label Image Segmentation for Medical Applications Based on Graph-Theoretic Electrical Potentials*", in Proceedings of the 8th ECCV04, Workshop on Computer Vision Approaches to Medical Image Analysis and Mathematical Methods in Biomedical Image Analysis, p. 230-245, May 15, 2004, Prague, Czech Republic, Springer-Verlag.
[3] A. Levin D. Lischinski and Y. Weiss *Colorization using Optimization*. SIGGRAPH, ACM Transactions on Graphics, August 2004.
[4] Liron Yatziv and Guillermo Sapiro *Fast Image and Video Colorization using Chrominance Blending*, IEEE Transactions on Image Processing, vol. 15, no. 5, pp. 1120-1129, May 2006.
[5] A. Levin D. Lischinski and Y. Weiss *A Closed Form Solution to Natural Image Matting* in IEEE Conf. on Computer Vision and Pattern Recognition (CVPR), June 2006, New York
[6] US 2006/0147115 System and method for image segmentation by a weighted multigrid solver
[7] US 2006/0050959 System and method for image segmentation by solving an inhomogenous dirichlet problem
[8] US 2006/0159343 System and method for multi-label image segmentation of digital photographs
[9] US 2006/0039611 Border matting by dynamic programming
[10] US 2004/0008886 Using graph cuts for editing photographs
US 2002/0048401 Graph cuts for binary segmentation of n-dimensional images from object and background seeds
[12] U.S. Pat. No. 6,744,923 System and method for fast approximate energy minimization via graph cuts
[13] Yuri Boykov and Vladimir Kolmogorov, *An Experimental Comparison of Min-Cut/Max-Flow Algorithms for Energy Minimization in Vision* in IEEE Transactions on Pattern Analysis and Machine Intelligence (PAMI), September 2004.

BACKGROUND OF THE INVENTION

There is a wealth of work on interactive assignment of properties to an image. One approach can be first to segment the image and then associate all pixels in each segment with a different property. For a comprehensive background on state-of-the art interactive segmentation approaches, see [1]. One particularly relevant approach segments images/videos or assigns properties to images/videos by letting the user mark pixels that are within the interior of objects. The following approaches relate to particularly well-known approaches.

Magic Wand [1], allows the user to select a region by marking a point. It may be seen that in graphics programs that employ this technique, such as ArcSoft PhotoStudio® of ArcSoft, Fremont, Calif., USA, selection of a point using the magic wand causes other non-contiguous areas of the picture to be selected. This may be undesirable.

Other known approaches based on scribbles are prone to the same problem. For example, FIG. 1 is a screen shot of an image of which it is required to select only a part using a scribbles-based selection tool such as described in [3] based on colorization, that is, the assignment of colors to a grayscale image. As would be seen more clearly in color image, a single pink scribble assigns a pink hue to the entire image. In practice, however, it may more generally be required to paint only a part of the image, such as the flowers, with the assigned pink color. The method described in [3] is limited in the user experience in that it requires the user to maintain a set of scribbles and delete sometimes a scribble or a part of it.

Bayes matting, Knockout 2 [1] and other multi-scribble approaches [2-11], segment images or assign properties by letting the user mark multiple scribbles. For these methods to provide useful results, the user must mark a plurality of scribbles (also termed "seeds") that provide at least two different properties. For example, in image matting or segmentation as taught in e.g. [2, 5], the user must provide scribbles for all segments. In colorization as taught in e.g. [3, 4], the user must provide scribbles for a plurality of colors. The workflow of these methods allows the user to build up the plurality of scribbles incrementally by adding or removing a scribble at each iteration. More specifically, these approaches may appear incremental to the user but in fact use the aggregate information provided the totality of the scribbles to compute color assignment. In other words, from the user's point of view, the input provided to the system is the aggregate set of the plurality of scribbles. Therefore, even if the scribbles set is built up incrementally, and even if the user adds a single scribble at each iteration, these methods all employ the sum totality of multiple scribbles in each iteration. Hence the user, in order to control these methods, needs to be aware of the full set of the plurality of scribbles. It would clearly be preferable if the result of each iteration served as the starting point for a subsequent iteration, so that the user could then better gauge how a new scribble would impact on the final result.

SUMMARY OF THE INVENTION

According to one aspect of the invention there is provided a computer-implemented method for assigning attributes to an image, the method comprising:

processing pixels of an image containing a single marked area spanning more than a single pixel that defines for a current iteration a target attribute so as to determine an optimal function that defines a respective attribute of pixels in the image;

assigning respective attributes to pixels in the image according to the optimal function; and displaying the attributes of said pixels.

According to a variation of the invention, there is provided a method for assigning properties to an image or a video sequence in a video space-time volume, the method comprising:

marking using a computer selection tool during successive iterations a respective single area in the image or in the video space-time volume spanning more than a single pixel, so as to assign at least one property to the pixels in said area;

computing at each iteration respective properties of pixels in the image or video, given the properties of the pixels in the marked area and given the computed result at a previous iteration; and displaying the image so as to highlight at least one of the computed properties.

According to another aspect of the invention, there is provided a system for assigning properties to an image or a video sequence, the system comprising:

a marking tool to mark during successive iterations a respective single area in the image or in the video space-time volume spanning more than a single pixel, so as to assign properties to the pixels in said area;

a computational unit responsive to the properties of the marked area and to an additional input constraint for computing at each iteration respective properties of pixels in the image or video, and a display unit coupled to the computational unit for displaying the image or video.

The term 'attributes' as applied to pixels refers to properties of the pixels such as color, saturation, hue and so on. The terms 'attributes' and 'properties' are used interchangeably. The type of attributes is application-dependent. For example, in layer separation, or segmentation, the attributes may be the assignments of pixels to a particular segment/layer. In colorization, the attributes may be the colors of pixels. In matting, the attributes may be the relative portions of each pixel that are assigned to each of the mat layers. In color correction, the attributes may be the specific color transformation to be applied to each pixel's color values; in motion assignment, the property may be the geometric transformation associated with each pixel; in depth assignment, the property may be the depth or normal vector of the surface patch associated with each pixel, and so forth.

Thus, the invention provides a method for interactive assignment of attributes to pixels in an image, a set of images, or a video, using only a single marked area. The invention can be applied to an image part, a video part or parts of image sets. With the method according to the invention, the user uses a computer-implemented tool (e.g. a brush) to mark areas that we call "scribbles". These scribbles are used to associate the marked pixels with some property/properties.

More specifically and in contrast to hitherto-proposed methods as discussed above, according to an embodiment of the invention, the tool allows segmentation to a plurality of segments. However, the invention is more general than segmentation, allowing the user to assign continuous properties without explicitly segmenting the image to a discrete set of segments. Moreover, and again in contrast to hitherto-proposed methods, the method according to the invention can be used with a single scribble at each iteration, using the previously computed result as additional input. The user need not provide multiple scribbles or maintain an incrementally-built set of scribbles.

In accordance with some embodiments, semi-automatic layer selection tools are provided. For example, the notion of a "current" layer may be employed whereby a newly marked scribble is associated with the "current" layer. It is also possible that no layer will be selected, in which case the next marked scribble is associated with a new layer.

This method according to the invention is very intuitive and easy to use. It may also be combined with sophisticated algorithms for choosing "related" attributes. The result is that the user can easily perform high quality matting, colorization, depth assignment, etc.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In order to understand the invention and to see how it may be carried out in practice, some embodiments will now be described, by way of non-limiting example only, with reference to the accompanying drawings, in which:

FIG. 15 is a pictorial representation showing depth information associated with pixels in a 2D image in accordance with a different aspect of the invention; and FIGS. 16a, 16b and 16c are pictorial representations relating to a plane depth tool used to add depth to a 2D image.

DETAILED DESCRIPTION OF EMBODIMENTS

Figure 1:
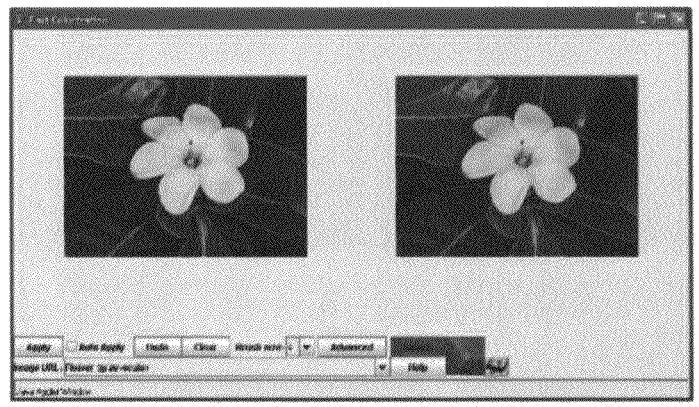
FIG. 1 is a screen dump showing results of a prior art graphics tool for assigning an attribute to a selected area.
Figure 2A:
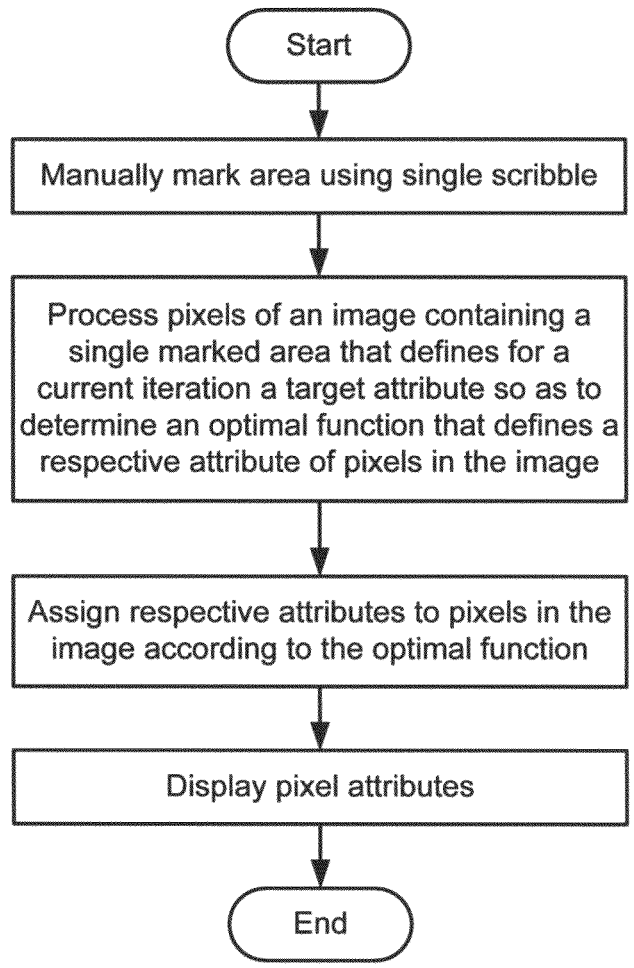
FIGS. 2a and 2b are flow diagrams showing the principal operations carried out by a method according to different embodiments of the invention for assigning attributes to pixels in a selected area.
Figure 3:
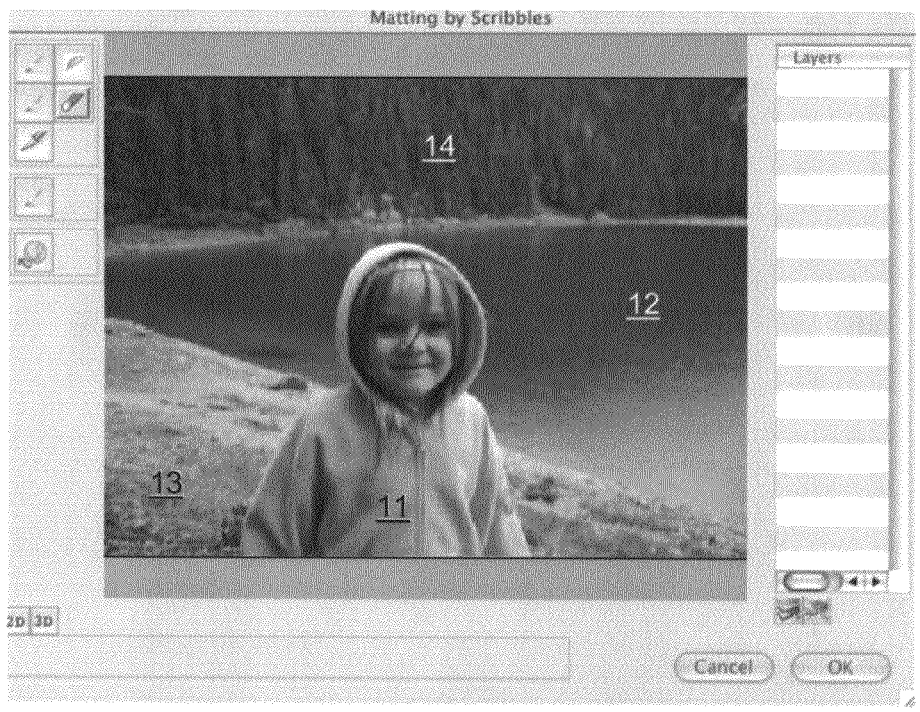
FIG. 3 is a screen dump showing a conventional image prior to processing according to the invention for assigning attributes.
Figure 4:
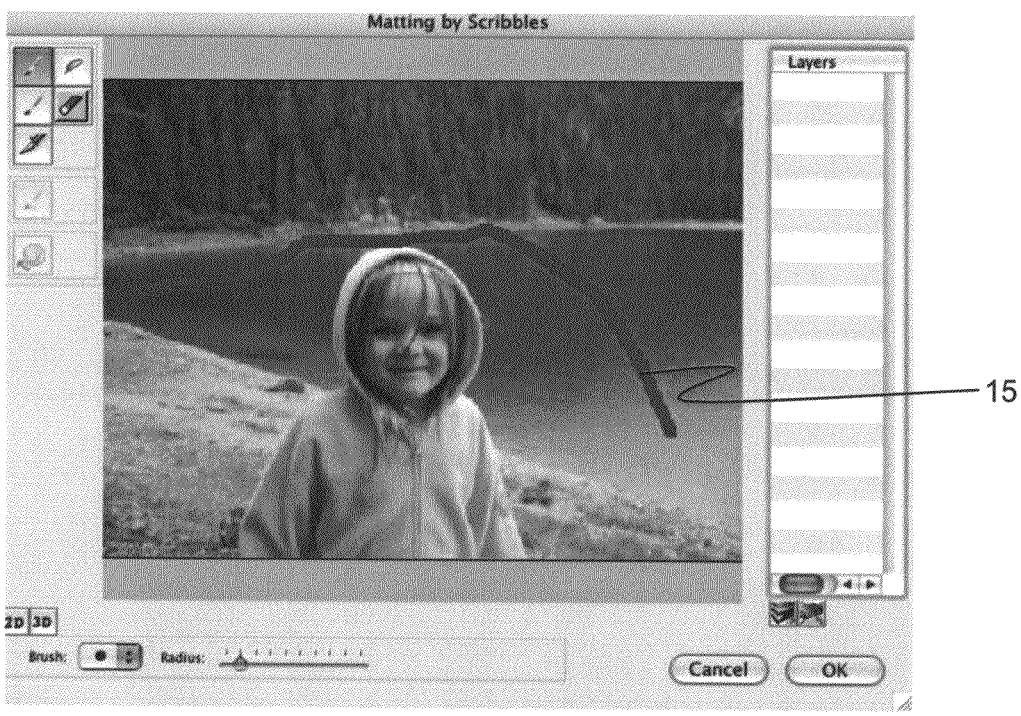
FIG. 4 is a screen dump showing an area of the image shown in FIG. 2 selected using a single scribble.
Figure 5:
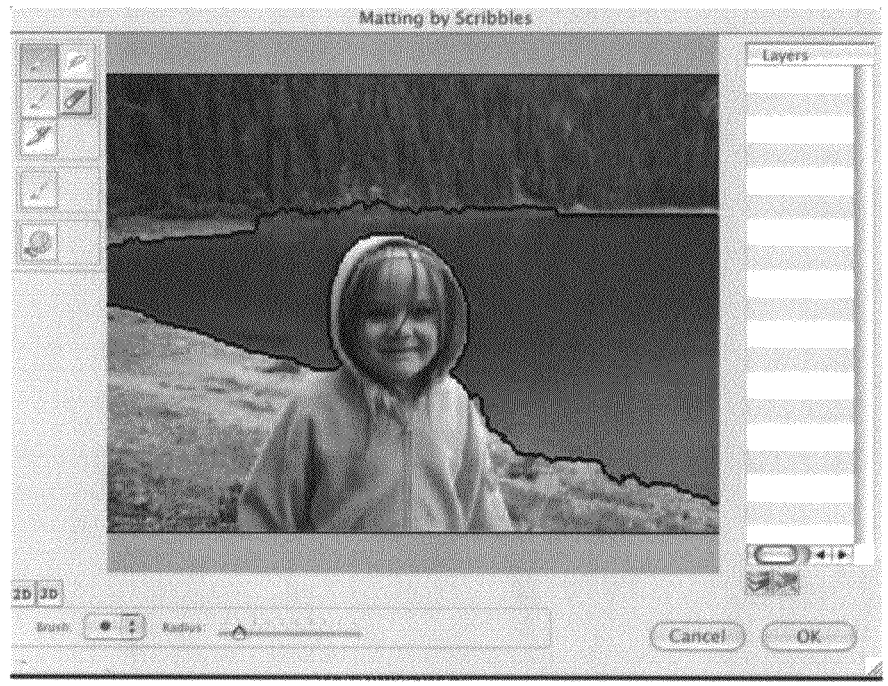
FIG. 5 is a screen dump showing a computed boundary defining the area selected in FIG. 3.

FIG. 2a is a flow diagram showing the principal operations carried out by a method according to an embodiment of the invention for assigning attributes to pixels in a selected area of an image 10 shown at various stages of processing in FIGS. 3 to 5. To explain the proposed workflow, we will focus on the particular example of image segmentation (e.g. segmentation to layers). A user manually selects an area of the image by applying a single scribble to the desired area. The pixels marked by the user define an area wherein a common pixel attribute may be ascribed to the marked pixels within an appropriate significance level or where marked pixels are constrained to have this attribute. In other applications of the invention, such as those not related to segmentation, the user may need to mark pixels that have similar attributes. Thus, the scribble identifies a single marked area that defines a target attribute. In accordance with a broad aspect of the invention, the pixels of the image shown in FIG. 3 are processed so as to determine an optimal function that defines a respective attribute of pixels in the image, while constraining all pixels in the marked area to have the defined target attribute. Respective attributes as thus determined are assigned to pixels in the image according to the optimal function, and the attributes of the pixels are displayed.

Figure 2B:
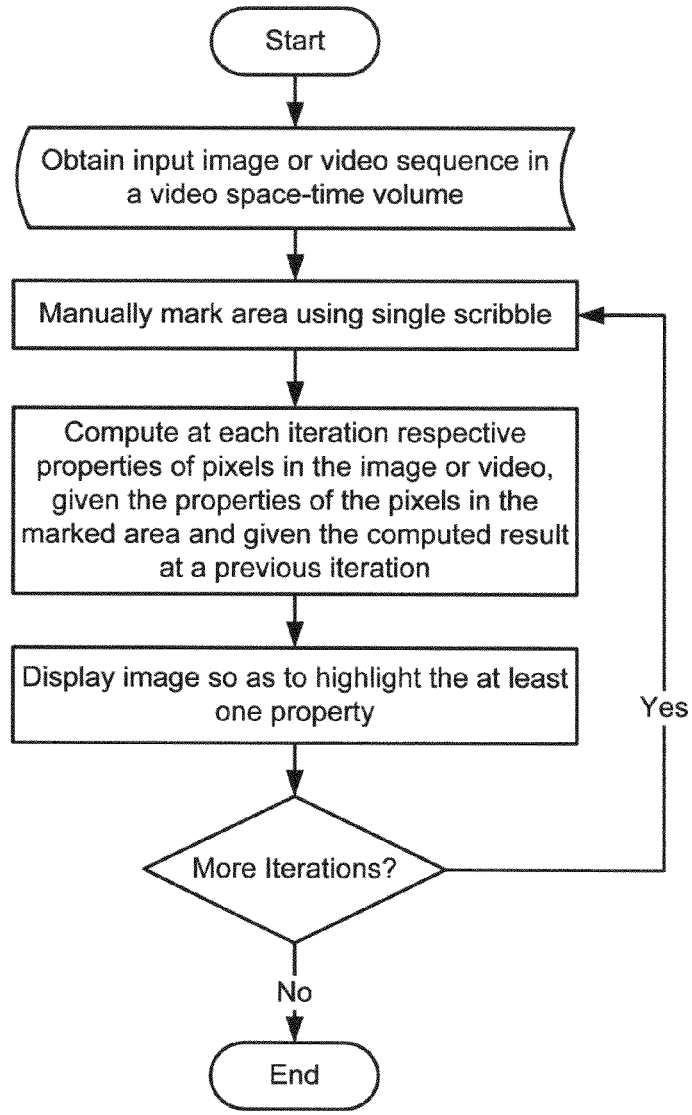

FIG. 2b is a flow diagram showing a variation of the method described above for assigning properties to an image or a video sequence in a video space-time volume. A computer selection tool such as a pointer is used during successive iterations to mark a respective single area in the image or in the video space-time volume, so as to assign at least one property to the pixels in the marked area. At each iteration respective properties of pixels in the image or video are computed, given the properties of the marked area and given the computed result at a previous iteration. The image is displayed so as to highlight at least one of the computed properties.

With further reference to FIGS. 3 to 5, FIG. 3 shows the original image 10 of a girl 11 in the foreground against a background having essentially three separate areas comprising a lake 12 and a coastal area containing lawn 13 and forest 14 before marking is added. Initially, none of the pixels belongs to any segment.

FIG. 4 shows a first iteration wherein a single first scribble 15 is added that is confined only to the area of the lake 12. FIG. 5 shows the result after the first scribble, whereby the image is divided into two segmented layers identified as Section 1 and Section 2. In order to allow subsequently marked areas of the image to be associated with a specific layer, all layers in the image are listed in a user-selectable list 16 shown at a side of the display and which can be named by the user, for example "background" and "foreground". Subsequently selected areas may be associated with the layer highlighted in the list 16, of which by default the first layer is highlighted. The scribble areas, and related pixels, are either used to create new layers or are added to one of the existing layers. The layer to which pixels are added is selected by the user from the list of existing layers, or to a new layer in the case that no layer is currently selected. Section 1 contains the marked area confined within the boundary of the lake and Section 2 contains the remainder of the image including the girl and the coastal areas. It will thus be noted that a layer may contain a plurality of connected components. The division of an image or video into segments is a standard procedure as described for example in [11]. One segment will contain the scribble (or part of it) and all pixels related to it, the other segment will contain the rest of the pixels. It should be noted that the invention is not limited to marking a single scribble at each iteration. The user may mark multiple scribbles that may or may not belong to the same layer. If multiple scribbles are marked, the software will divide the image into two or more layers according to the relations of the pixels to the marked scribbles. Thus, the method according to the invention can work with a single scribble, but is not limited to a single scribble. Furthermore, even when multiple scribbles are used, the previous computed result is used together with the currently marked scribbles as an input whereas, as noted above, hitherto proposed methods use the aggregate set of scribbles marked at all iterations and ignore the previous computed result.

Figure 6:
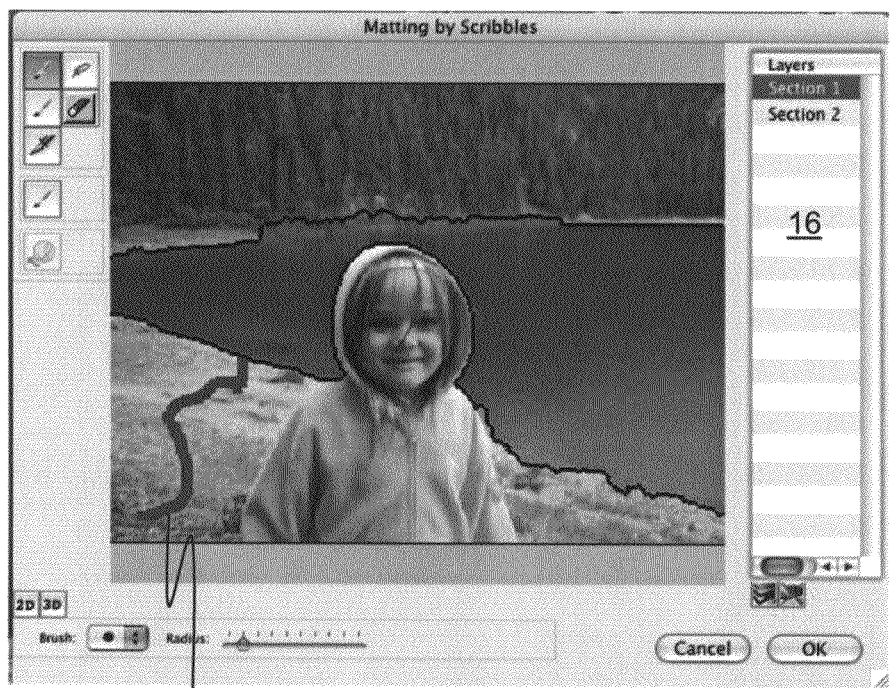
FIG. 6 is a screen dump showing addition of a second scribble for selecting a different area.
Figure 7:
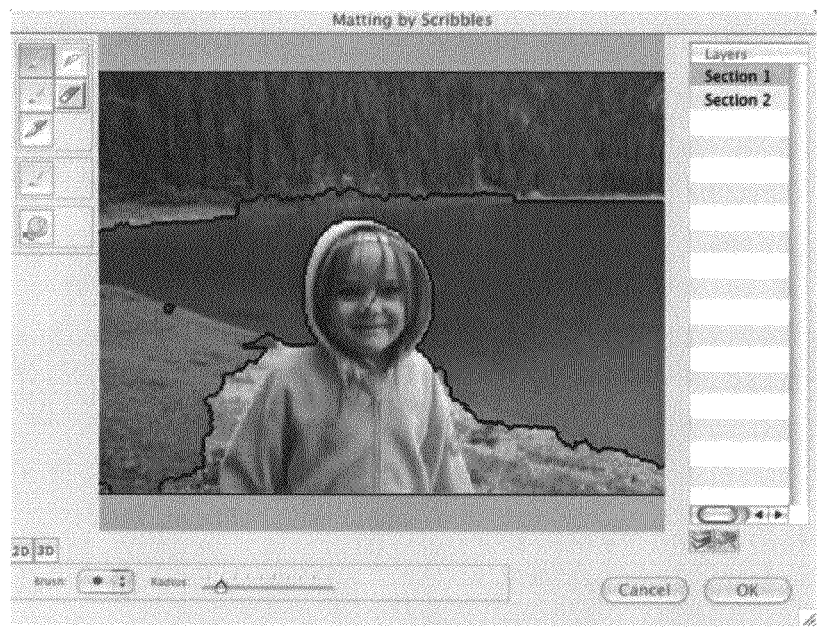
FIG. 7 is a screen dump showing a computed boundary defining the area selected in FIG. 6.

FIG. 6 shows a second iteration wherein a second scribble 20 is added that crosses the boundary between the lawn and the lake. FIG. 7 shows the result after the second scribble, whereby the first layer identified as Section 1 is extended and contains part of the marked area confined within the boundary of the lake and Section 2 contains the remainder of the image including the girl and the coastal areas. It will be appreciated that the result of this iteration is not yet a perfect final result, as the algorithm only assigned a part of the background. Some more interactions with the user are required to achieve the desired result that assigns the lake and the lawn to the same segment. This is fairly typical of interactive segmentation algorithms in that two iterations are not enough to get the final result. The result also depends on the sensitivity measure, as determined by slider on the bottom.

Figure 8:
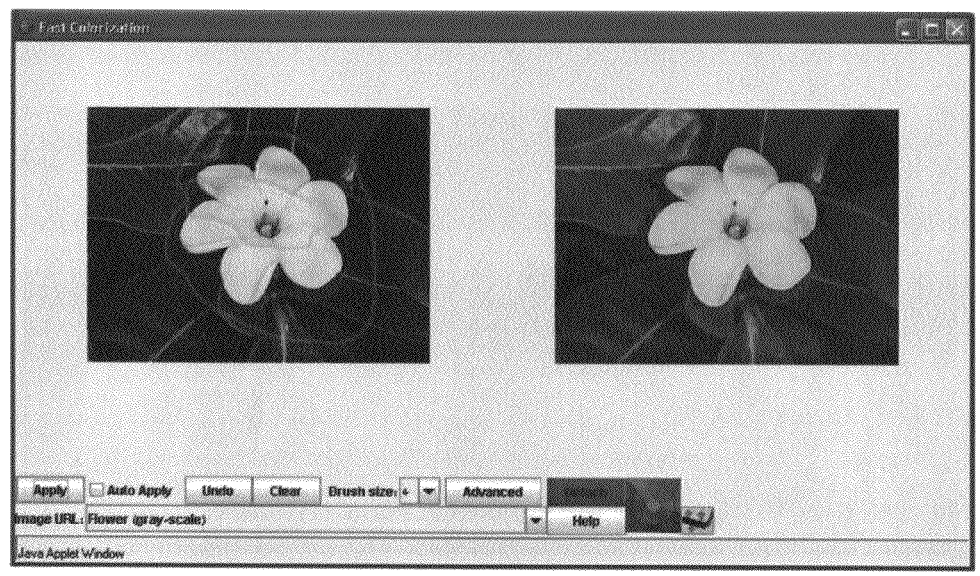
FIG. 8 shows screen dumps depicting results of error correction applied to a computed area.

FIG. 8 shows screen dumps depicting results of error correction applied to a computed area. The user started by drawing the pink scribbles over the flower. The user erroneously or maybe on purpose, marked the scribbles out of the flower. Now, the user tries to overcome this by drawing green scribbles in the erroneous area. This does not work with hitherto proposed methods such as [3] since, although the green scribble overwrites the pink scribble, some of the pink scribbles remain and some of the area which is outside the flower remain pink. The conventional way to fix this with hitherto-proposed tools is to revert to the layer of the pink scribbles, erase the pink scribbles from the flower and calculate the layers again. The fact that erroneous scribbles need to be erased requires other methods to display all old scribbles and to provide an "eraser" tool. It has been found that that displaying the old scribbles and having to erase some of them may not be not intuitive to all users.

Figure 9:
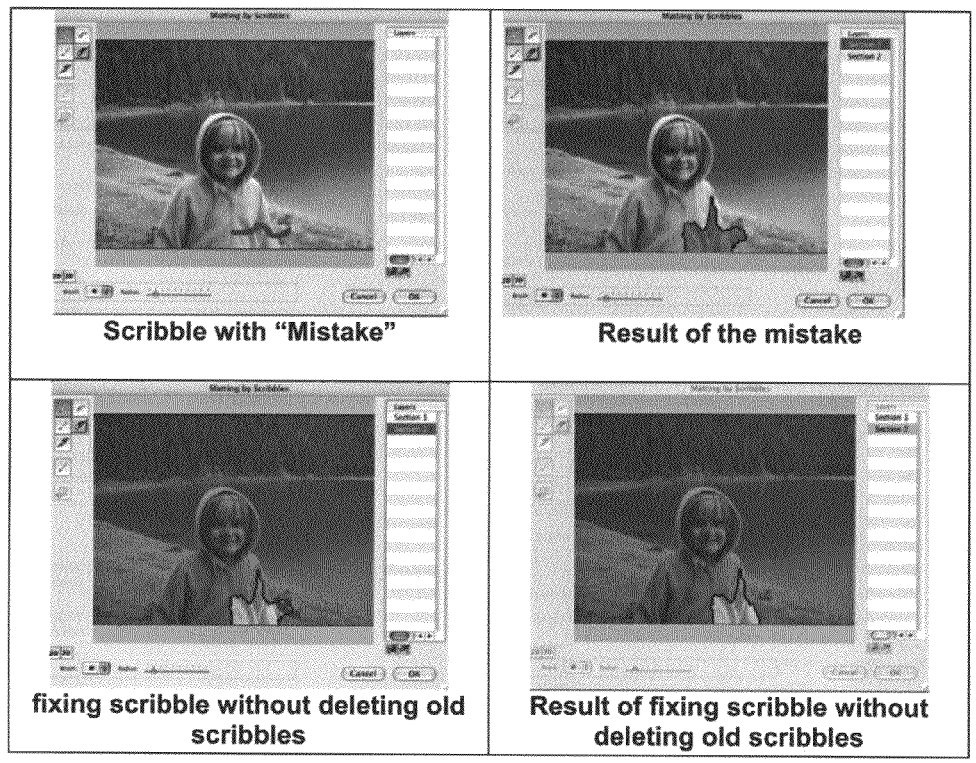
FIG. 9 is a series of screen dumps showing editing options for correcting errors.

In contrast, the method according to the invention will be demonstrated, this time in the context of image segmentation, with reference to FIG. 9 showing a series of screen dumps depicting editing options for correcting errors. A user marks a scribble in the background, but accidentally marks into the foreground. Using the invention, the user will fix this by marking a scribble in the foreground, as shown in FIG. 9. In the top left picture, the user marks a scribble to denote the girl, but accidentally marks also the lawn. As a result, the computed layer includes pixels of the girl as well as pixels of the lawn, as shown at the top right. In order to correct for this mistake, the user simply needs to scribble on the lawn area after selecting the lawn layer (defined as "Section 2" in the layers list at the top right of the software application window), as shown at the bottom right. The result, as shown in the bottom right picture, is that all lawn pixels are re-assigned to their correct layer. This is in contrast to hitherto-proposed methods, such as [3], in which the user would need to delete the previously marked scribbles.

Implementation

Here we propose one way to implement the invention. The GUI module presents to the user the result of the previous iteration, and lets the user mark one or more scribbles, each associated with its properties. For example, in image segmentation, the scribbles may be associated with the segment index. In addition, one can define a so-called sensitivity-measure. Intuitively, this measure will influence the distance measured in the number of pixels at which properties propagate away from the scribbles. In the bottle example, at one extreme only the scribble itself will become orange, while at the opposite extreme the whole image will become orange, and for other sensitivity values either parts of the bottle will be colored or just the bottle itself and no more, or more than the bottle—all depending on the sensitivity measure. So, intuitively, the sensitivity factor determines the distance over which the "orangeness" propagates. The sensitivity measure can be determined by different means, for example using a slider in the GUI.

The algorithmic module of the software receives as input the marked scribble (or scribbles), the source image/video, and the result of the previous iteration (or an indication that this is the first iteration), and possibly additional parameters like the sensitivity measure.

Before providing an example of a detailed implementation for the algorithmic module, it should be emphasized that alternative implementations can be employed, and that this implementation is provided in order for one to be able to implement the proposed invention efficiently.

The proposed implementation includes two stages:
A. Compute a "flood-fill area" in the neighborhood of the marked scribble or scribbles. In the following we further explain the meaning of "flood fill area" and how it is computed.
B. Apply a property-assignment algorithm to the "flood-fill area".

Before discussing details of specific algorithms, it should be noted that property-assignment algorithm may be used for removing red-eye effects from videos and images by identifying an area of the image associated with the red eye and then assigning the black color attribute to the marked area.

Stage A can be implemented, for example, by computing a distance map from the scribble or scribbles, such as geodesic distance map, and thresholding the distances such that all distances smaller than a given threshold value are considered to be in the flood-fill area. The threshold value can be determined by the sensitivity-measure mentioned above, which can be determined, for example, using a slider in the GUI. A detailed implementation of geodesic distance maps computation from a set of scribbles can be found in reference [3]. It should be noted that the flood fill is not limited to thresholded geodesic distance map. For example, a flood fill can be defined based on a representation of the color distribution of the pixels within the scribbles' areas, or distributions of pixel functions within the scribbles' areas. More specifically, flood fill can be implemented by redefining distance maps, in such a way that instead of using pixel color differences in the distance map computation, one uses pixel color differences minus the closest color difference that can be found frequently enough in the distribution of pixel differences within the scribble areas. Alternatively, instead of using pixel color differences in the distance map computation, it is possible to use a function of the pixel color differences frequency in the distribution of pixel differences within the scribble areas (e.g. if f is the frequency in the color difference distribution, use log(f+1)).

It should be noted that the invention allows the sensitivity-measure to be changed before, after or during the scribble marking. In other words, the user may, for example, first mark the scribble, and then change the sensitivity-measure (e.g. by moving the slider) until the user is satisfied with the result. Alternatively, the user may influence the sensitivity-measure during the scribble drawing. For example, the software may determine the sensitivity-measure according to properties of the marked scribblers, e.g. by its total area.

For stage B, we propose two implementations, one for assigning discrete properties to the image/video, and one for assigning continuous properties.

Stage B Implementation: Discrete Properties

We define a directed graph G=(V,E). The set of nodes in the graph V is a union of three subsets $V=V_1 \cup V_2 \cup V_3$. $V_1$ is the set of pixels marked with scribbles, $V_2$ is the set of pixels inside the flood-fill area that are not marked with a scribble, and $V_3$ is the set of pixels on the boundary of the flood-fill area and not in the flood-fill area.

The set of edges E in the graph includes all pairs of pixels from V×V which are neighbors in the image/video. Neighborhood in the image/video can be defined in many ways, e.g. 8-neighborhood which defines pixels as neighbors if they differ at most by 1 in all coordinates. Pairs including two vertices from $V_3$ in practice need not be included in E. We further define a labeling function L(p), that defines for each pixel one of a set of discrete values (in image segmentation, L(p) denotes the segment index).

Graphs can be represented in software in many ways. Examples for graph representations and optimizations over graphs can be found in reference [12].

We define a cost function over the graph above and the labeling, and solve for its optimum. In the case where only a single scribble is marked, or all scribbles are associated with the same property, an approximation can be formulated as a min-cut max-flow problem, as we show below, for which many optimization solutions exist [13].

In the case where multiple scribbles associated with different properties are marked, the solution can be achieved using multi-label optimizers, e.g. iterated graph-cuts [12], as was done in a similar task in [1].

Solution with Multi-Label Optimizers

In the general case, the solution can be achieved using multi-label optimizers, e.g. iterated graph-cuts (see [12]), as was done in a similar task in [1]. The solution is found by optimizing the following cost function:

$$E(L) = \sum_{(p_1,p_2)\in E} f_N(p_1, p_2, L) + \sum_{p \in V_1 \cup V_3} f_S(p, L(p)) + \sum_{p \in V_2} f_B(p, L(p))$$

Here L is the labeling of the image/video pixels to its properties.

The functions $f_N$, $f_S$, $f_B$ may vary according to the application. For example, in image segmentation, $f_N$ can be defined as weakly inverse monotonic in the directional derivative in case the labeling of the two pixels $L(p_1)$, $L(p_2)$ is different, and zero otherwise. In our implantation, for example, we took a scaled negative exponent of the differences of colors of pixels $p_1, p_2$ under $L_\infty$ norm:

$$f_N(p_1, p_2, L) = \begin{cases} e^{-k\|I(p_1)-I(p_2)\|_\infty} & L(p_1) \neq L(p_2) \\ 0 & L(p_1) = L(p_2) \end{cases}$$

where k is a scaling parameter that can be set experimentally e.g. to 1/255.

$f_B$ can be set to 0 for all labels for all pixels, but it can be set to different values to express some prior assumption that prefers relating the pixels to particular properties.

$f_s$ typically expresses the constraint of the scribbles. Let us define IL(p) as follows. If p is in $V_1$, then IL(p) is the label associated with the scribble. If p is in $V_3$, then IL(p) is the label of p in the previous iteration (or a new label if this is the first iteration). Then $f_s$ is defined to be:

$$f_S(p, l) = \begin{cases} 0 & l = IL(p) \\ \infty & \text{otherwise} \end{cases}$$

Here ∞ stands in a computer implementation for a very large number. Intuitively, this means that the scribbles pose a hard constraint on the solution. One can alternatively use weaker constraints, by replacing the number corresponding to ∞ with smaller numbers that may be different for different pixels.

Once the solution to the optimization is found, the result of the current iteration can be computed. This is done by copying the labelings of the pixels in the flood fill area from the optimization solution to the result of the previous iteration (or at the first iteration, setting the optimization solution to be the first iteration result).

Solution with Min-Cut

In the case where there is a single scribble marked in the current iteration, or all marked scribbles have the same property, we can define a cost function with 2 labels. Such a cost function can be minimized using min-cut-max-flow [6], as we show below. In min-cut optimization, we add two nodes S,T, and the optimization splits the graph vertices to two sets, one connected to S, and one connected to T. The basic idea is that the vertices that will be found to be connected to S, will have be assigned the label of the scribble, whereas the rest of the vertices will preserve their assignment from the previous iteration (or will be assigned to a new value if the method is within the first iteration). For the sake of simplicity we split $V_3$ to two sets: $V_{3A}$ is the set of vertices in $V_3$ that has the property associated with the scribble/s in the result of the previous iteration, and $V_{3B}=V_3 \backslash V_{3A}$.

The capacities of edges $C(p_1,p_2)$ within the set E are set to be $C(p_1,p_2)=f_N(p_1,p_2, L)$. The capacities of all edges connecting T to pixels in V are set to be 0, and similarly the capacities of all edges connecting pixels in V to S are set to be 0.

The capacities $C(S,p)$ of edges connecting S to pixels p in $V_1$ or $V_{3A}$ are set to be ∞.

The capacities $C(p,T)$ of edges connecting pixels p in $V_{3B}$ to T are set to be ∞.

All other edges connecting vertices to T or from S will have capacity 0.

Here ∞ stands in a computer implementation for a very large number. Intuitively, this means that the scribbles pose a hard constraint on the solution. One can alternatively use a weaker constraint, by replacing the ∞ number with a smaller number.

In another implementation, one can set the capacities of edges connecting vertices in $V_2$ from S to have positive values, in order to express some prior assumption that prefers relating the pixels to the scribble property. Similarly, one can set the capacities of edges connecting vertices in $V_2$ to T to have positive values, in order to express some prior assumption that prefers not to relate the pixels to the scribble property.

Now, the solution to the min-cut problem (or the multi-label optimizer) will be used to set the image segmentation. All pixels that are found by the min-cut optimization to be connected to S will be assigned with the scribble property. Other pixels will be assigned the label they had in the result of the previous iteration (or, at the first iteration, will be assigned to a new label).

Stage B Implementation: Continuous Properties

We present one implementation for the continuous case as applied to the colorization and matting tasks in [4, 5]. These references use an optimization technique to minimize cost functions over continuous functions by solving a set of linear equations. Note that applications other than matting and colorization can be implemented in this approach by merely changing the cost function to be minimized. Our implementation of stage B is identical to the above references with one twist: in the above references all hard constraints are defined by the scribbles marked by the user. In our implementation, we use the scribbles marked by the user as one set of constraints, and generate additional constraints for each pixel in $V_3$. In other words, our solution can be achieved by means of reduction: Implement the methods in [4], [5], and add a scribble for every pixel in $V_3$ with the labeling of the previous iteration. This scheme is useful for generalizing discrete two-label tasks such as binary image segmentation as described in [11] to continuous image matting.

In order to make the operation of the invention more tangible, an example will now be presented by describing the process in case of segmentation (layering). This will be followed by a different example within the context of colorization which assigns continuous properties.

Thus, suppose a user wishes to select an image object within the contour defined by a bottle. The user starts by marking a scribble inside the bottle. To the user, what seems to happen is that the image is divided into two areas that seem to look as if the scribble has expanded. This expansion is not symmetric in all directions, but rather looks as if it stops at directions where the image variability is stronger. If, for example, the color variation in the bottle is very small and the bottle edges are strong, then the scribble will expand to the bottle edges. If, on the other hand, the bottle has a textured appearance, the scribble may expand to cover only a part of the region of interest (as in the lawn in the picture of the girl shown in FIG. 3). The user is provided with a slider (constituting a sensitivity selector) that controls the extent of expansion.

The result of this stage is a segmentation of the image to two layers.

What happens underneath in our implementation is a two stage process:

A. Apply an algorithm for "scribble expansion" that divides the image to three regions: 1) scribble, 2) expanded scribble minus the original scribble, 3) rest of the image.

B. Apply an algorithm to find the most prominent boundary within region 2) above between the two segments. This is mathematically equivalent to a search for an assignment of segment values to pixels in the unknown area such that this assignment induces the most prominent boundary During subsequent iterations, each scribble is either associated with one of the existing layers or a new layer, which we will denote by layer L. The user marks a scribble that appears to "eat" portions of existing segments to make layer L bigger.

What happens underneath in our implementation is similar to what is described above, only that region 3) will keep its original labeling from previous iteration. Note that in finding the most prominent boundary (stage B above), the algorithm also takes into account the segmentation result from previous iteration since it influences where there are boundaries between layer L and the other layers.

In colorization, the process is similar, but here we assign a continuous hue value to each pixel. This means that typically, except the scribble area itself, typically most of the colors assigned to the image will not be identical to the scribble color. In a first iteration, if the user marks an orange scribble on the bottle, she will see the bottle becoming more orange and other parts of the image stay grayish, but not exactly the same hue all over the bottle (depending how strong the bottle boundary is compared to the texture inside the bottle area).

Figure 10:
FIGS. 10 and 11 are screen dumps showing results of matting according to an embodiment of the invention as applied to a marked area.
Figure 11:
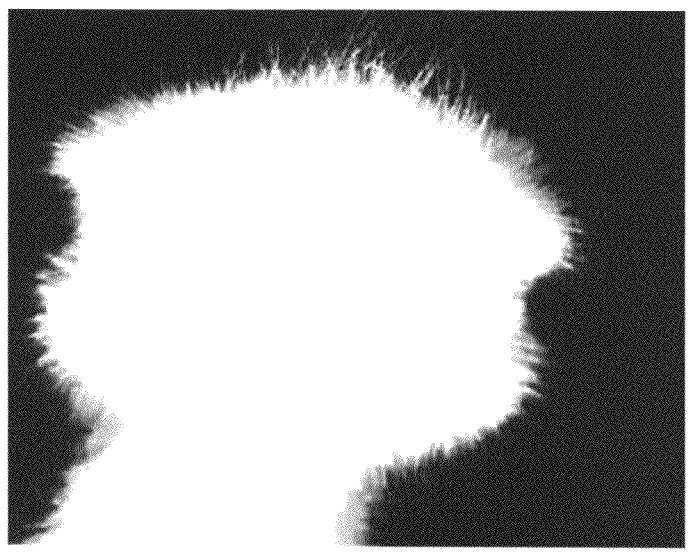

FIGS. 10 and 11 are screen dumps showing results of colorization according to an embodiment of the invention as applied to a marked area as described above with reference not to a bottle but to a bird on which there is marked a single scribble. The scribble is depicted by a bright area that renders it more visible in grayscale. FIG. 11 shows the visualization of the assignment result, wherein each pixel is assigned a number in the continuum between 0 and 1 that shows how much of its hue has become orange.

The implementation here can be similar to the above, only that stage B is changed: Instead of looking for the most prominent boundary, we use an algorithm that searches for an assignment of hue to all pixels in the unknown area (region 2) such that hue changes correspond to edges/gradients in the original input image. This means that in a blurry image whose edges are smeared, the hue transition will be gradual.

Additional Tool: Re-Assigning Properties to an Area

Another set of tools is proposed for re-assigning properties to an image. Let us assume we are working in an interactive property assignment application, such as the one presented in this invention. The proposed tools allow the user to mark an area, and hence request to re-compute the property assignment in this region only. We are referring to a plurality of tools, since these tools may vary in several aspects:

(i) The algorithm used in this tool may or may not be different than the algorithms used in previous iterations of the application.
(ii) The boundaries of the marked area may or may not be taken into account when re-computing this area.
(iii) The tool may or may not include an option to add more constraints, for example by allowing the user to draw scribbles within the marked area.

Figure 12:
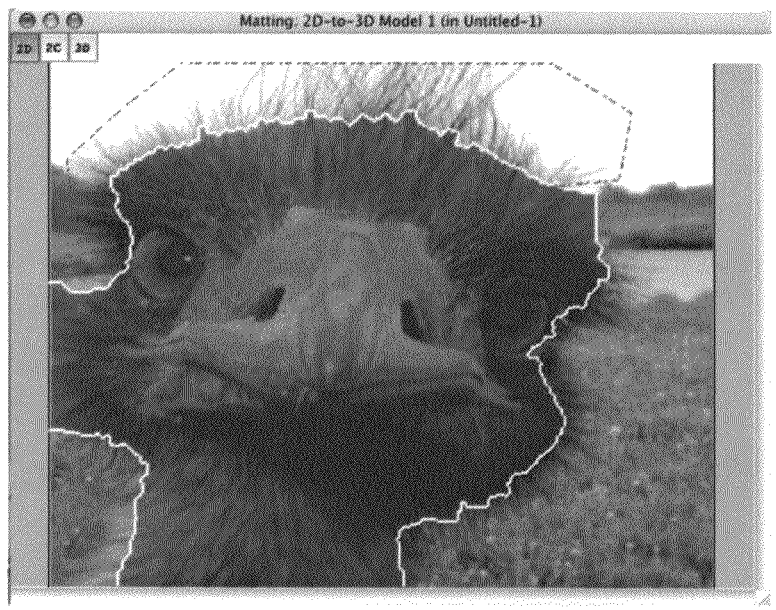
FIGS. 12 and 13 are screen dumps showing results of error correction applied to a computed area.
Figure 13:
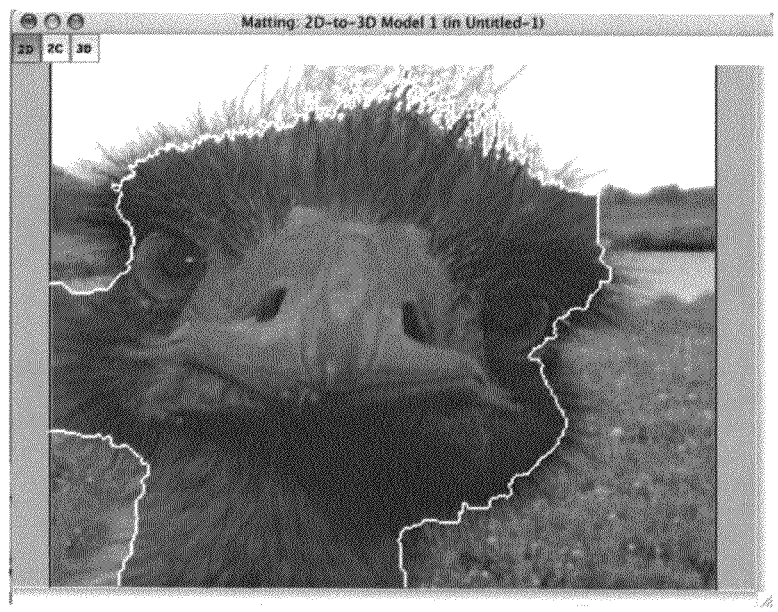

FIGS. 12 and 13 are images that show the effect of a re-assignment tool according to such an embodiment of the invention in the context of image segmentation. FIG. 12 shows the segmentation result of the previous iteration in an interactive image segmentation application as described above. In accordance with a further embodiment, there are proposed tools that allow the user to mark an area and request to re-assign properties in the marked area. In the example, this is done to re-segment the image by drawing a bounding curve around the area of interest.

FIG. 13 shows the recomputed results. In this particular example, the segmentation result of the previous iteration was used on the boundaries of the marked area as constraints, and the segmentation in the marked area was recomputed by assigning continuous segmentation using the algorithm described in stage B in the previous section, and then thresholding them by 0.5. In previous iterations the segmentation algorithm assumed discrete properties.

One implementation of the tool is straightforward, by using an implementation of stage B as described in the above section "Implementation". Stage B was defined in that section to be "Apply a property-assignment algorithm to the "flood-fill area". In the proposed re-assigning tool, instead, we apply a property-assignment algorithm to the area marked by the user.

To further explain aspect (ii) above, consider the use of Stage B for discrete properties. In this implementation, aspect (ii) above means that we may include the neighborhood constraints $f_N$ over the vertices $V_3$. In such case we do take the boundaries into account. Alternatively, we may choose not to include the constraints in which case we do not take the boundaries into account.

Figure 14:
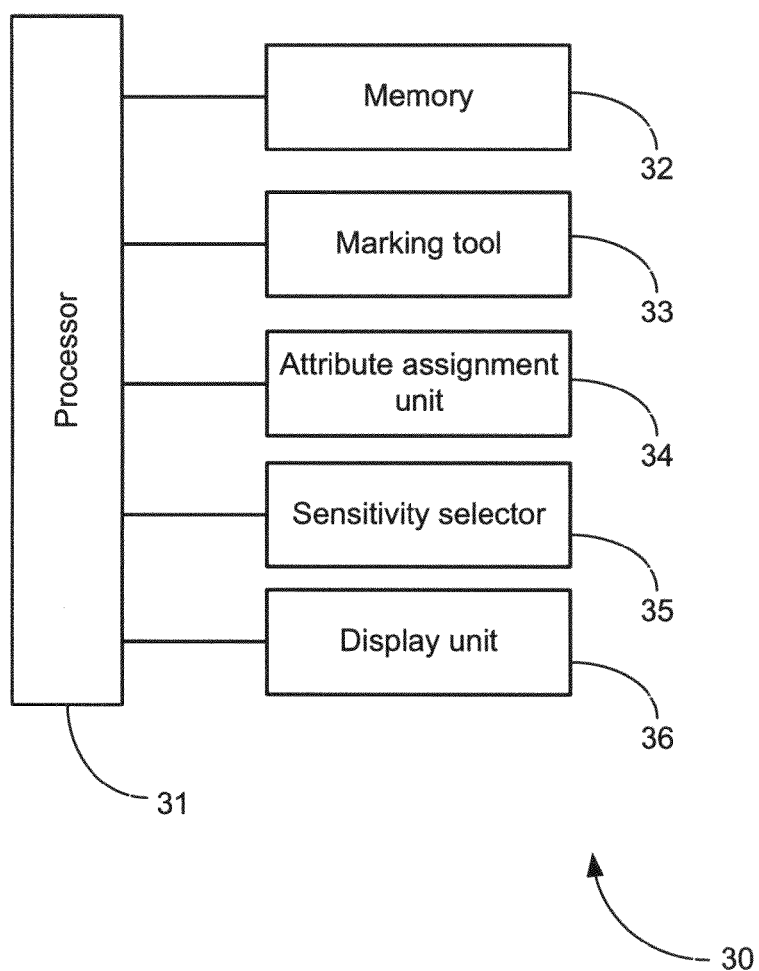
FIG. 14 is a block diagram showing functionality of a system according to an embodiment of the invention for assigning attributes to pixels in a selected area.

FIG. 14 is a block diagram showing functionality of a system 30 according to an embodiment of the invention for assigning attributes to an image. The system 30 comprises a processor 31 for processing pixels of an image stored in a memory 32 and containing a single marked area that defines for a current iteration a target attribute so as to determine an optimal function that defines a respective attribute of pixels in the image. This may be done while constraining pixels in the marked area to have said target attribute. A marking tool 33 is used to mark the image for the current iteration although a pre-marked image may be used as input to the system 30. An attribute assignment unit 34 is coupled to the processor 31 for assigning respective attributes to pixels in the image according to the optimal function. A sensitivity selector 35 may be coupled to the processor 31 for adjusting the sensitivity of the distance at which properties propagate away from the scribbles. A display unit 36 coupled to the processor 31 displays the attributes of the pixels in conjunction with the stored image.

The method according to the invention is typically carried out as an iterative process, where each successive iteration applies a constraint that is the result of the previous iteration, so that the successive iterations converge to a desired result. Most typically, successive iterations are executed by an application program that is adapted to operate in accordance with the method of the invention. However, such an application program may also be adapted to take as input the output of a different program or even the output of the same program produced previously.

Depth Tools

This aspect of the invention includes a complete workflow to convert a 2D image or an image part into a 3D model, represented as an image+depth map. The basic proposed workflow is to provide the user with an initial 3D model and a standard 3D GUI that allows the user to observe the 3D model from his desired perspectives. Then, using a rich set of tools, the user can sculpture the 3D model by assigning depth values to the image.

The key to understanding the proposed invention lies in the data representation and rendering, as shown in FIG. 15. Depth values of image pixels are represented with respect to what we call The canonic perspective. Intuitively, the canonic perspective imitates the viewing perspective from which the 2D image was originally captured, including the position, orientation and other properties of the capturing camera such as field of view and zoom. In practice, we construct a virtual world by placing the image texture on a plane (which we call the texture plane, e.g. the plane Z=0) and place the canonic perspective such that it will capture exactly the full texture of the image. For example, we can decide on an arbitrary distance of the canonic perspective from the texture plane and set the field of view of the canonic perspective so that it captures exactly the full image texture (we omit the details that can be easily computed using high-school trigonometry).

For convenience, we set the world coordinate system so that the Z axis is the optical axis of the canonic perspective, the directions of the world X,Y axes are the directions of the X,Y axes of the captured image, and the origin is the pinhole of the canonic perspective. In this representation, the depth value of a 3D point is simply the Z coordinate of this point, and the Z axis of the world coordinate system intersects the image texture plane at origin of the texture coordinate system.

Note that while for convenience we selected this coordinate system, the invention can be implemented with alternative coordinate systems. For example, if other coordinates systems are used, we can include additional transformations that will account for the coordinate system's change.

The tools we propose edit the set of depth values associated with the image pixels. We shall refer to this set of values as depth map. Then, at any time the 3D model needs to be rendered to 2D or used in any other way, this is done with a new representation which we call corrected-perspective-representation (CPR). The CPR can be created explicitly or implicitly as part of the rendering. The CPR representation is created as follows: Let (X,Y) be an image texture coordinate, let Z be its associated depth value, and let d be the depth of the image texture plane, as shown in FIG. 15. The corresponding CPR point is given by (X/d*Z,Y/d*Z,Z).

Depth Editing Tools

Plane Depth Tool

This tool allows the user to assign a plane geometry to a certain area in the image texture. The user is provided with two control points which he can place in arbitrary positions on the 3D model. Given the current viewing perspective in the 3D GUI, the method intersects the viewing ray of each control point with the current 3D model. This intersection defines for each control point the texture coordinates (X,Y) and the depth map value Z.

Now, the user can drag the control points and interactively see the effect of this on the model. Dragging on screen is translated to dragging the 3D control point using what we call a "dragging plane". Given a dragging plane, by moving the control point, e.g. with the mouse, the method associates the mouse position on the screen with the location on the dragging plane by intersecting the viewing ray of the mouse position with the dragging plane. The dragging plane can be set automatically by the method, to be a plane orthogonal to the current viewing direction in the 3D GUI or some plane close to it, in both cases such that the control point is incident on this plane. In one implementation, the dragging plane is selected to be one of {XY,XZ,YZ} that is closest to the plane orthogonal to the current viewing direction.

Any dragging of control point may change either its associated texture coordinates (X,Y), e.g. by dragging in the direction of the X or Y axis, or the depth map value (by dragging on the Z axis).

Now, given the position of the two control points, the tool updates the depth map by drawing a gradient on the depth map between the two control points. The values in the depth map are determined in the following manner:

Let (X1,Y1), (X2,Y2) be the texture coordinates of the two control points, and let Z1,Z2 be the depth values of the two control points.

Define:

$$\hat{v} = (X2, Y2) - (X1, Y1)$$

$$v = \frac{\hat{v}}{\|\hat{v}\|}$$

Given a point (X,Y), its depth Z can be determined by the following function (or a similar one):

$$s = (X - X1, Y - Y1)^T v$$

$$Z = \begin{cases} Z1 & s <= 0 \\ Z1 + \frac{Z2 - Z1}{\|\hat{v}\|} s & 0 >= s >= \|\hat{v}\| \\ Z2 & s >= \|\hat{v}\| \end{cases}$$

or simply by:

$$Z = Z1 + \frac{Z2 - Z1}{\|\hat{v}\|} s$$

FIGS. 16*a*, 16*b* and 16*b* are pictorial representations of a plane depth tool. FIG. 16*a* is a view of the image texture from the canonic perspective. The image texture was segmented to two regions, and the plane depth tool is applied to the sign segment. In a colored rendition it is seen that the sign appears blue to show that it is selected. In FIG. 16*b* is a view of the 3D model from a different perspective, before applying the tool, and FIG. 16*c* shows the same view right after applying the tool.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A computer-implemented method for assigning attributes to an image, the method comprising:
   displaying an unsegmented image;
   marking by a user a plurality of pixels in a region of the unsegmented image as a single marked area by a single scribble covering the plurality of pixels, the single marked area defines, for a current iteration, at least one target attribute for the region;
   determining according to the target attribute an optimal function that defines at least one respective attribute of pixels in the region;
   assigning the at least one respective attributes to pixels in the region according to the optimal function; and
   segmenting the unsegmented image in accordance with the at least one respective attribute.

2. The method according to claim 1, further including inputting a sensitivity measure to determine the size of the region that is influenced by the marked area.

3. The method according to claim 1, further including constraining pixels in the marked area to have said target attribute.

4. The method according to claim 1, further including applying an additional input constraint to pixels in the unsegmented image.

5. The method according to claim 1, wherein an additional input constraint is a given assignment of attributes to pixels in the unsegmented image.

6. The method according to claim 5, wherein the given assignment is the result of a previous iteration.

7. The method according to claim 1, wherein said image is an unsegmented image.

8. The method according to claim 1, wherein said single marked area having at least two sub areas each having a different of a plurality of colors.

9. A method for assigning properties to an image or a video sequence in a video space-time volume, the method comprising:
- displaying an unsegmented frame of a video sequence video space-time volume;
- marking by a user to use a computer selection tool during successive iterations for marking a respective single area in a region of the unsegmented frame by a single scribble covering a plurality of pixels, so as to assign at least one property to the pixels in said area;
- computing at each iteration respective properties of pixels in the video sequence, given the properties of the pixels in the marked area and given the computed result at a previous iteration; and
- displaying the video sequence so as to highlight at least one of the computed properties.

10. The method according to claim 9, wherein computing properties preserves properties assigned to the marked area and some of the properties of pixels in non-marked areas computed in a previous iteration.

11. The method according to claim 9, wherein the computed properties being used for segmenting a frame of the video sequence to a plurality of regions, each assigned property being respectively a classification of each image pixel to one of plurality of segments or a classification of each frame pixel at each video frame to one of plurality of segments.

12. The method according to claim 9, wherein the computed properties being used for matting of an image or a video, wherein the assigned property for each pixel is respectively the portions of which it belongs to each of plurality of layers or the portions of which it belongs to each of plurality of layers.

13. The method according to claim 9, wherein the computed properties being used for a member of a group consisting of augmenting color to an image or a video sequence, changing the colors of an image or a video sequence, and removing red-eye effects from videos and images.

14. A system (30) for assigning properties to an image or a video sequence, the system comprising:
- a marking tool (33) to allow a user to mark by a single scribble during successive iterations a respective single area in a region of an unsegmented image or in an unsegmented video sequence in a a video space-time volume spanning more than a single pixel, so as to assign properties to the pixels in said area;
- a computational unit (31) responsive to the properties of the marked area and to an additional input constraint for computing at each iteration respective properties of pixels in the unsegmented image or the unsegmented video and segmenting the unsegmented image or an unsegmented frame of the unsegmented video sequence in accordance with the respective properties; and
- a display unit (36) coupled to the computational unit for displaying the image or video.

15. The system according to claim 14, wherein the additional input constraint is a given assignment of attributes to pixels in the image.

16. The system according to claim 15, wherein the given assignment is the result of a previous iteration.

17. The system according to claim 14, wherein the given assignment is used as a boundary constraint.

18. The system according to claim 14, wherein said additional input constraint is derived as an output from an external computer program.

19. The system according to claim 14, wherein the computational unit is adapted to compute said properties such that properties assigned to the marked area are preserved and some of the properties of pixels in non-marked areas computed in the previous iteration are preserved.

20. The system according to claim 14, further including a sensitivity selector (35) coupled to the computational unit for adjusting the sensitivity of the distance at which properties propagate away from marking made to said area.

* * * * *